United States Patent [19]

Imaizumi et al.

[11] Patent Number: 5,021,805

[45] Date of Patent: Jun. 4, 1991

[54] RECORDING DEVICE WITH SHEET HEATER

[75] Inventors: Mamoru Imaizumi, Nagoya; Hikaru Kaga, Ama, both of Japan

[73] Assignee: Brother Kogyo Kabushiki Kaisha, Japan

[21] Appl. No.: 399,835

[22] Filed: Aug. 28, 1989

[30] Foreign Application Priority Data

Aug. 30, 1988 [JP] Japan ................................ 63-215568

[51] Int. Cl.$^5$ ............................................ G01D 15/16

[52] U.S. Cl. ............................ 346/76 R; 346/76 PH; 346/140 R; 400/120; 400/126

[58] Field of Search ......... 346/76 PH, 160 PD, 76 R; 400/120, 126

[56] References Cited

U.S. PATENT DOCUMENTS 4,432,001 2/1984 Inui et al. ....................... 346/76 PH

FOREIGN PATENT DOCUMENTS 49-42749 11/1974 Japan .
55-69464 5/1980 Japan .
58-128878 8/1983 Japan .
0260360 12/1985 Japan .................................. 400/120
62-130863 6/1987 Japan .
62-130864 6/1987 Japan .
0098474 4/1988 Japan .............................. 346/76 PH
63-20541 8/1988 Japan .
22114717 7/1989 United Kingdom .
8902576 3/1989 World Int. Prop. O. .

*Primary Examiner*—Benjamin R. Fuller
*Assistant Examiner*—Huan Tran
*Attorney, Agent, or Firm*—Kane, Dalsimer, Sullivan, Kurucz, Levy, Eisele and Richard

[57] ABSTRACT

A recording device for recording on a sheet is provided with a heater for heating portions of the sheet on which printing is to be carried out. The heater is controlled by a memory which stores data related to the period of time required to heat the portions of the sheet to a predetermined temperature value as well as the time required to heat a preceding portion of the sheet.

20 Claims, 9 Drawing Sheets

RECORDING DEVICE WITH SHEET HEATER

BACKGROUND OF THE INVENTION

This present invention relates to a recording device providing a heater for heating a recording sheet in advance, and more particularly, to a recording device capable of sufficiently heating the recording sheet based upon a period of time required for recording operations executed on a preceding recording line so that heat soluble ink being used for recording characters symbols and the like, is permeated into fibers composing the recording sheet.

Conventionally, recording devices have been known wherein recording sheet is heated before conducting the recording operations by heating a platen, recording sheet, and so forth, for example, Japanese Utility Model Publication No. SHO49-42749. Especially, another prior art of a recording device using heat soluble ink wherein a state of the fixed ink is improved by heating recording sheet since the heat soluble ink is smoothly permeated into fibers composing the recording sheet, for example, Japanese Patent Publication No. SHO58-128878.

In such types of recording devices, however, carriage return operations, for returning a carriage mounting a recording head to a left side edge of a recording area on the recording sheet, are executed just after recording operations executed on each recording line are finished. If a volume of recording data for a certain recording line is very small, the next succeeding recording line to be used for recording is in the condition that it is insufficiently heated. Thus, on the recording lines which are not sufficiently heated, the state of fixed ink is imperfect, resulting in degrading the recording quality.

SUMMARY OF THE INVENTION

It is therefore an object of the invention to provide an improved recording device capable of controlling the recording sheet on which recording operations are executed so as to be fed after the recording sheet is sufficiently heated, so that the heat soluble ink used for recording is smoothly permeated into fibers composing the recording sheet.

For this purpose, according to this invention, there is provided a recording device employing a recording sheet, comprising a platen member for supporting the recording sheet, a recording head member provided on a carriage member being movable along the platen member, for executing recording operations on the recording sheet, sheet feed means for feeding the recording sheet by one recording line, and heat means for heating a predetermined portion of the recording sheet, the recording device further comprises: memory means for storing data relating to a period of time required for heating the predetermined portion of the recording sheet till a temperature value of the predetermined portion reaches a predetermined value; parameter set means for setting a predetermined parameter based upon a period of time having been required for executing recording operations on a certain recording line; and control means for controlling the sheet feed means so as to be operated in a predetermined manner in accordance with both the data stored in the memory means and the parameter set by the parameter set means.

DESCRIPTION OF ACCOMPANYING DRAWINGS

DESCRIPTION OF THE EMBODIMENTS

An embodiment of the present invention is described with reference to the drawings.

Figure 1:
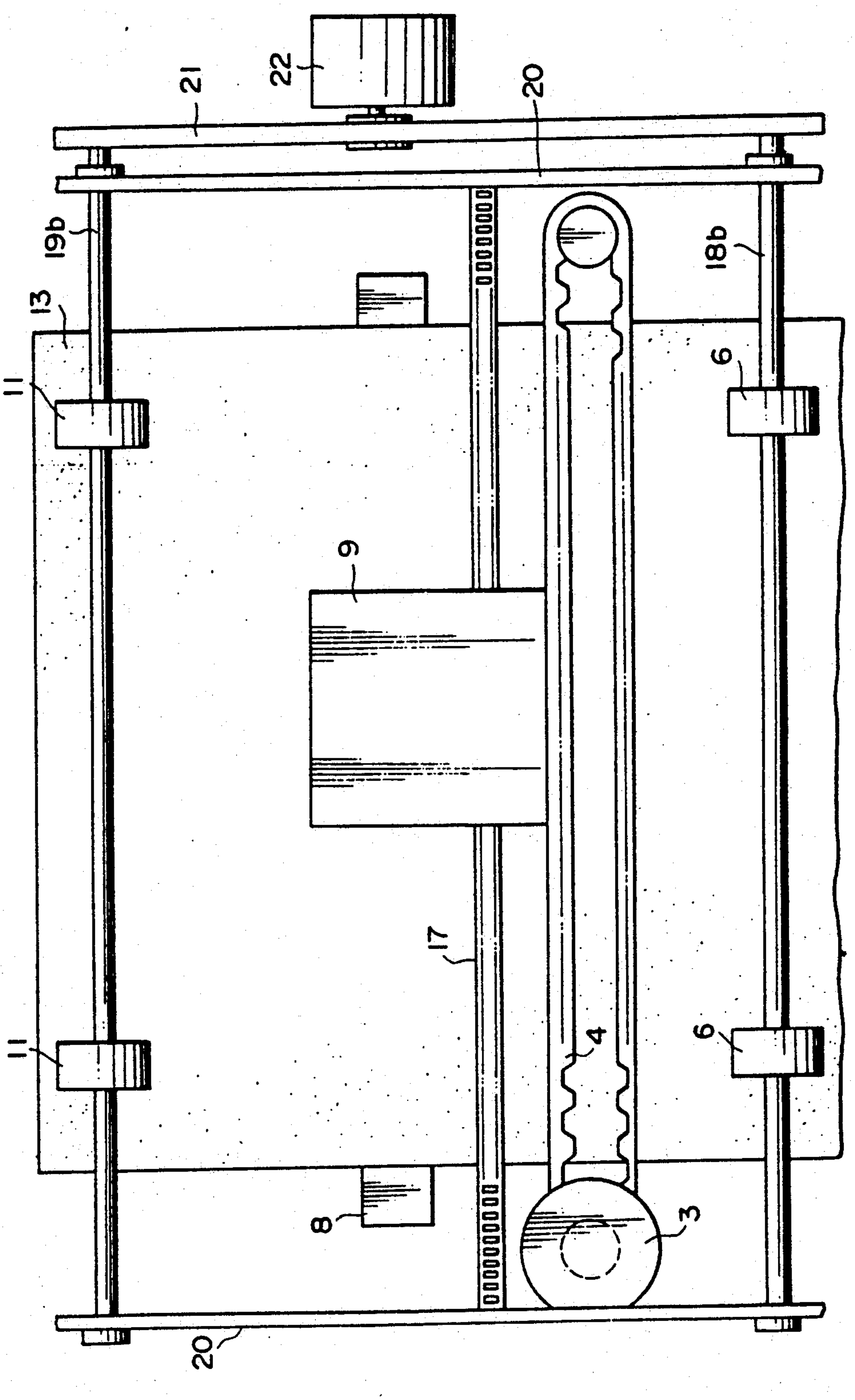
FIG. 1 shows a front view of a recording section of an ink jet recording device as a recording device according to the present invention.
Figure 2:
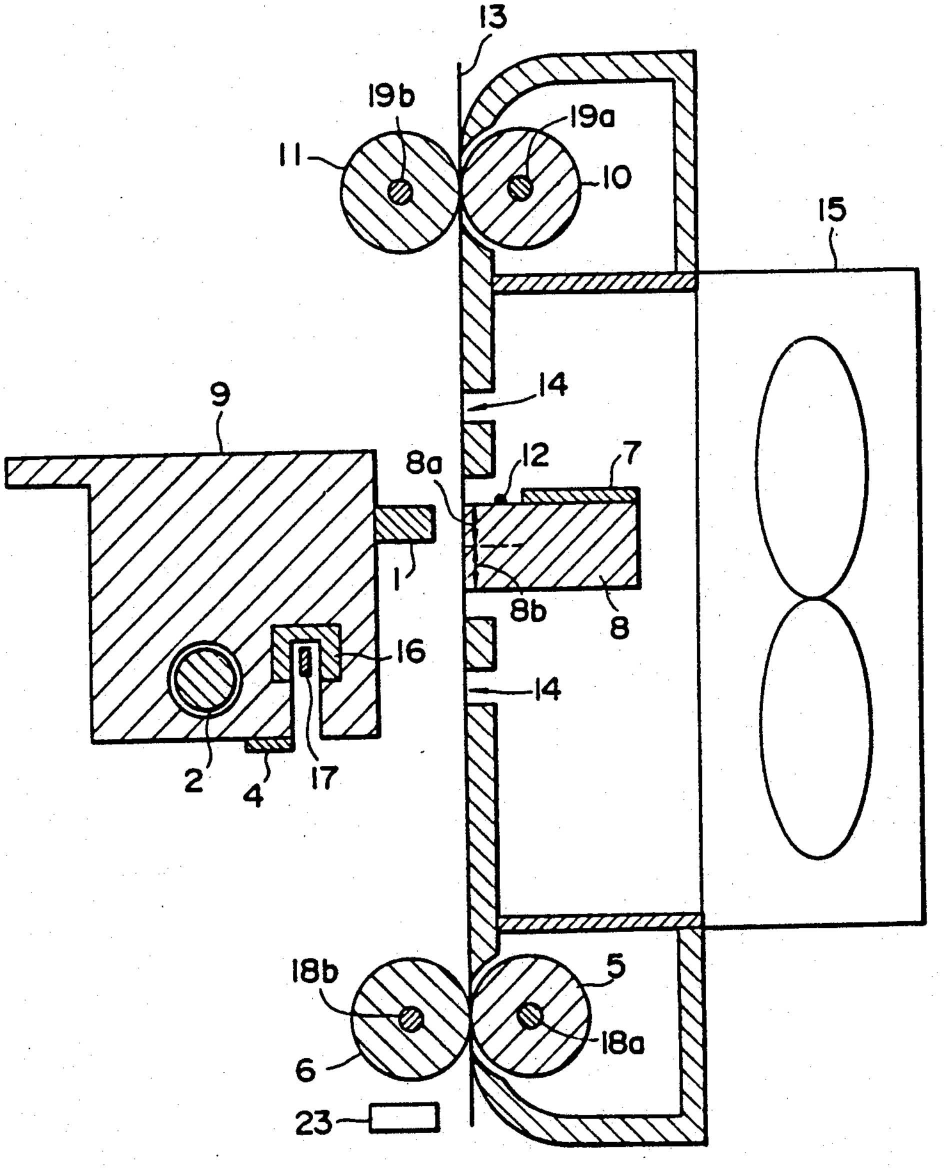
FIG. 2 shows a sectional view of the recording device of FIG. 1.

FIGS. 1 and 2 show a front view and sectional view representing outlines of an ink jet recording device according to the present invention. An ink jet head 1 sprays ink so that characters, symbols and the like are recorded on recording sheet 13. A carriage 9 which is equipped with the ink jet head 1 is provided so that it can travel in a direction along a guide shaft 2 by a driving force supplied from a carriage motor 3 through a timing belt 4. A lower sheet feed roller 5 and a lower pinch roller 6 respectively feeds the recording sheet 13 which has been fed by a feed member such as a well-known auto cut sheet feeder, not shown, to a recording position, namely a predetermined position on a platen 8. A pair of upper sheet feed rollers 10, 10 and a pair of upper pinch roller 11, 11 respectively feed the recording sheet 13 on which data have been recorded by the ink sprayed from the ink jet head 1, to a direction along which the recording sheet 13 is discharged. The rollers 5, 6, 10, and 11 are movable provided on rotating shafts **18*a*, 18*b*, 19*a*, and 19*b* with a frame 20. In addition, the rotating shafts 18*b* and 19*b* are rotated by a sheet feed motor 22 through a transfer mechanism including a belt 21 which is connecting the both rotating shafts 18*b* and 19*b***.

As shown in FIG. 2, the platen 8 is provided with a heater 7 which heats the platen 8 so as to heat the recording sheet 13 before recording operations. Thus, the platen 8 has at least two areas: one is a recording zone **8*a* which heats the recording sheet 13 and recording operations are executed on the corresponding position of the recording sheet 13, and the other is a pre-heat zone 8*b* which only heats the recording sheet 13. The platen 8 is equipped with a thermister 12 employed for controlling the temperature of the heater 7 so that the temperature is kept constant. On a sheet feed path near the platen 8, a plurality of air holes 14 are provided so that a fan 15 blows the recording sheet 13 against the platen 8. A sheet sensor 23 for detecting the presence of the recording sheet 13 is provided near the lower feed roller 5**.

The carriage 9 which is equipped with the ink jet head 1 provides a reading head 16 wherein a light emission diode and a photo transistor located on opposite side with each other, as a timing pulse generation device for taking a timing of driving the carriage 9 and controlling ink spray from the ink jet head 1. On the frame 20, an optical slit 17 passing a light for detecting a recording position is provided between the light emission diode and photo transistor of the reading head 16 provided on the carriage 9.

Figure 3:
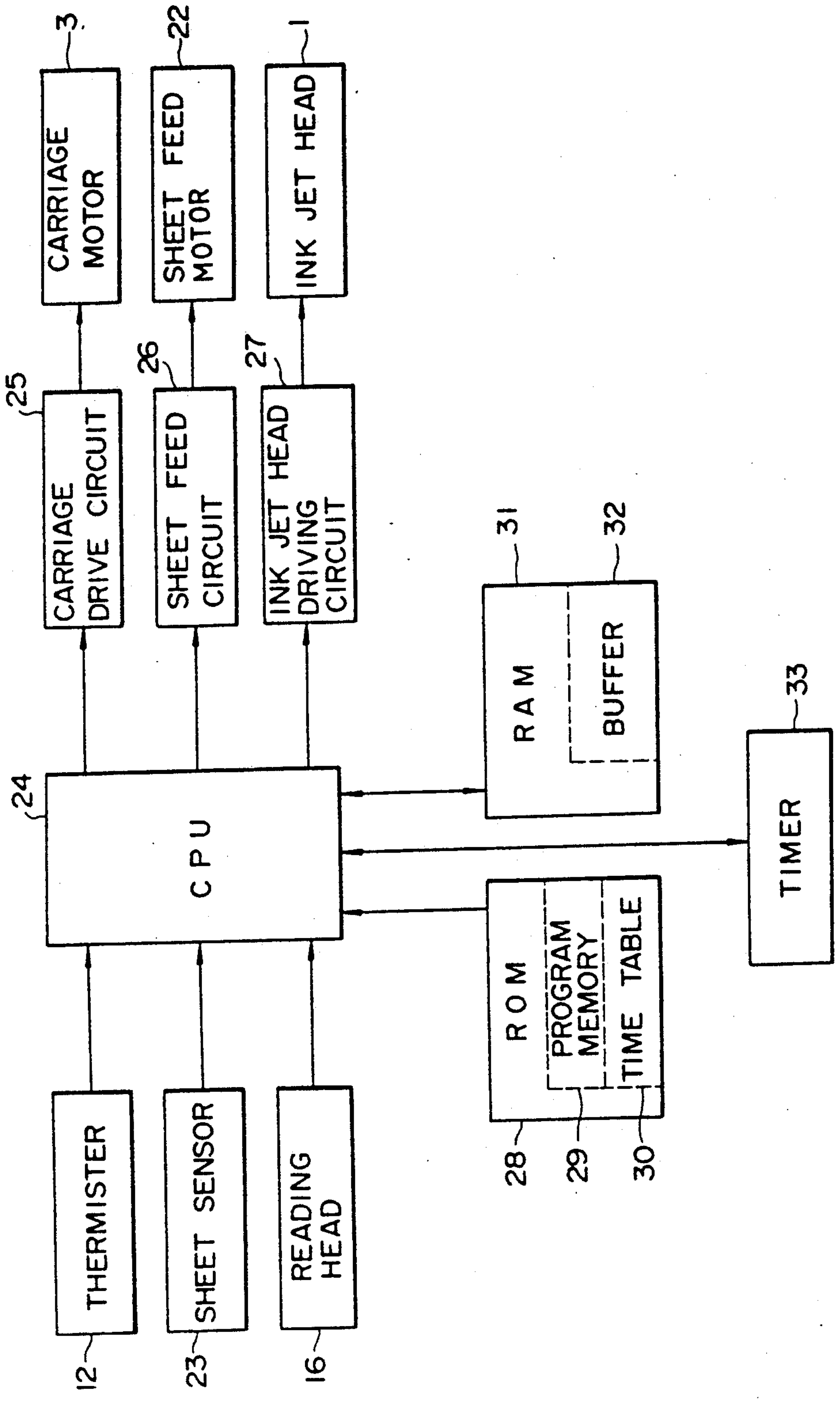
FIG. 3 shows a block diagram representing a structure of a control circuit for controlling the units included in the recording device of FIG. 1.

Referring to a block diagram of FIG. 3, the thermister 12 controls the temperature of the platen 8 heated by the heater 7 so as to be kept constant and detects an ambient temperature when the recording operations are executed.

The reading head 16 detects an amount of movement and speed of the carriage 9 so as to control the movement of the carriage 9. A timer 33 counts a scanning time of the carriage 9 and sheet feed time, namely a time required for recording data on one line.

A ROM (Read Only Memory) 28 and a RAM (Random Access Memory) 31 are memories conventionally widely used. The ROM 28 includes a program memory 29 which stores an operation program for a well-known CPU (Control Processing Unit) 24; and a heating time table 30 which stepwise stores a heating time required for heating the recording sheet 13 to a recordable setting temperature (described later) in accordance with the ambient temperature of the recording device. On the other hand, the RAM 31 stores recording information and so forth. In this embodiment, the RAM 31 includes a buffer 32 which temporarily stores a time count result by the timer 33 necessary for recording one line of data.

The CPU 24 controls a carriage drive circuit 25, sheet feed circuit 26, and ink jet head drive circuit 27 so as to drive the carriage motor 3, sheet feed motor 22, and the ink jet head 1.

Figure 4:
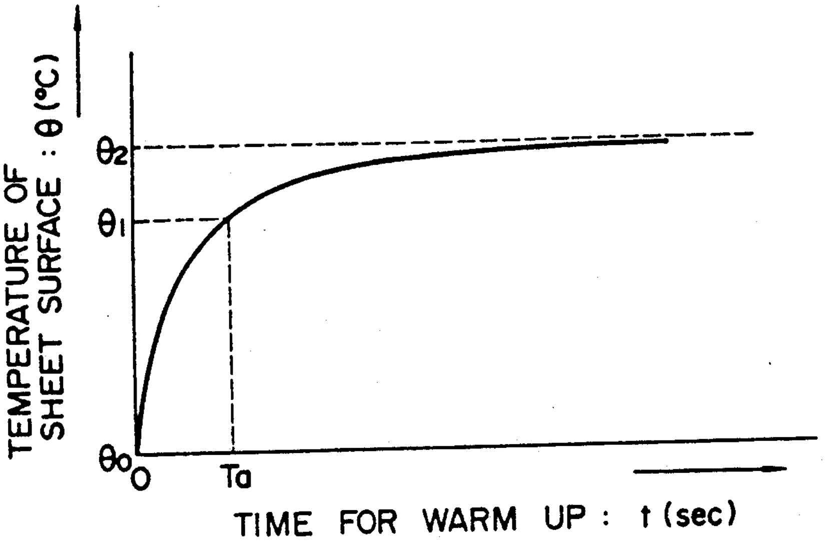
FIG. 4 shows a chart representing a relationship between a time required for heating a recording sheet employed in the recording device of FIG. 1 and a surface temperature of the recording sheet thereof.

FIG. 4 shows a chart representing a relationship between a time required for heating the recording sheet 13 and the surface temperature thereof when the nonrecording side of recording sheet 13 is touched to the platen heated by the heater 7. In the FIG. 4, $\theta_0$ is a temperature where the ink jet recording device is located, normally, which accords with the temperature of the recording sheet 13; $\theta_1$ represents a recordable setting temperature; $T_a$ represents a heating time required for heating the recording sheet 13 to the recordable setting temperature $\theta_1$. The recordable setting temperature $\theta_1$ is a temperature considering the fixture of ink for a hot melt ink jet printer on the recording sheet 13. When the recording sheet 13 is heated at less than the recordable setting temperature $\theta_1$, the ink cannot be permeated into fibers composing the recording sheet 13. Moreover, a diameter of a ink dot is small and the ink which is swelled is fixed on the recording sheet 13, resulting in degrading the recording quality. Thus, when the succeeding recording line which is heated on the pre-heat zone 8$b$ is sent to the recording zone 8$a$ after the recording operation on preceding line is completely finished, if the time required for the recording operations on the preceding line is less than the heating time $T_a$, the recording line being sent to the recording zone 8$a$ is not heated to the recordable setting temperature $\theta_1$, resulting in degrading the recording quality of the recording line.

Figure 5:
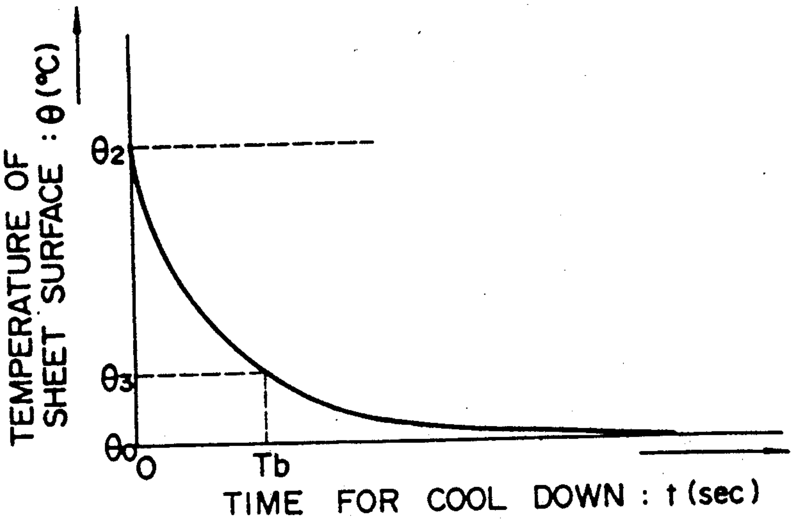
FIG. 5 shows a chart representing a relationship between a cooling time of the recording sheet and surface temperature thereof.

FIG. 5 shows a chart representing a relationship between a cooling time of the recording sheet 13 and the surface temperature thereof when a line of the recording sheet 13 on which data have been recorded is fed and separated from the platen 8. In the figure, $\theta_0$ represents a circumstantial temperature where the ink jet recording device is located. Normally, the temperature of the recording sheet 13 accords with $\theta_0$; $\theta_2$ represents the surface temperature of the platen 8; $\theta_3$ represents a temperature of the hot melt ink which is cooled and solidified so that it is not transferred to a contacting substance such as the upper pinch rollers 11; and $T_b$ is a cooling time of the surface temperature of sheet which drops to $\theta_3$.

Figure 6:
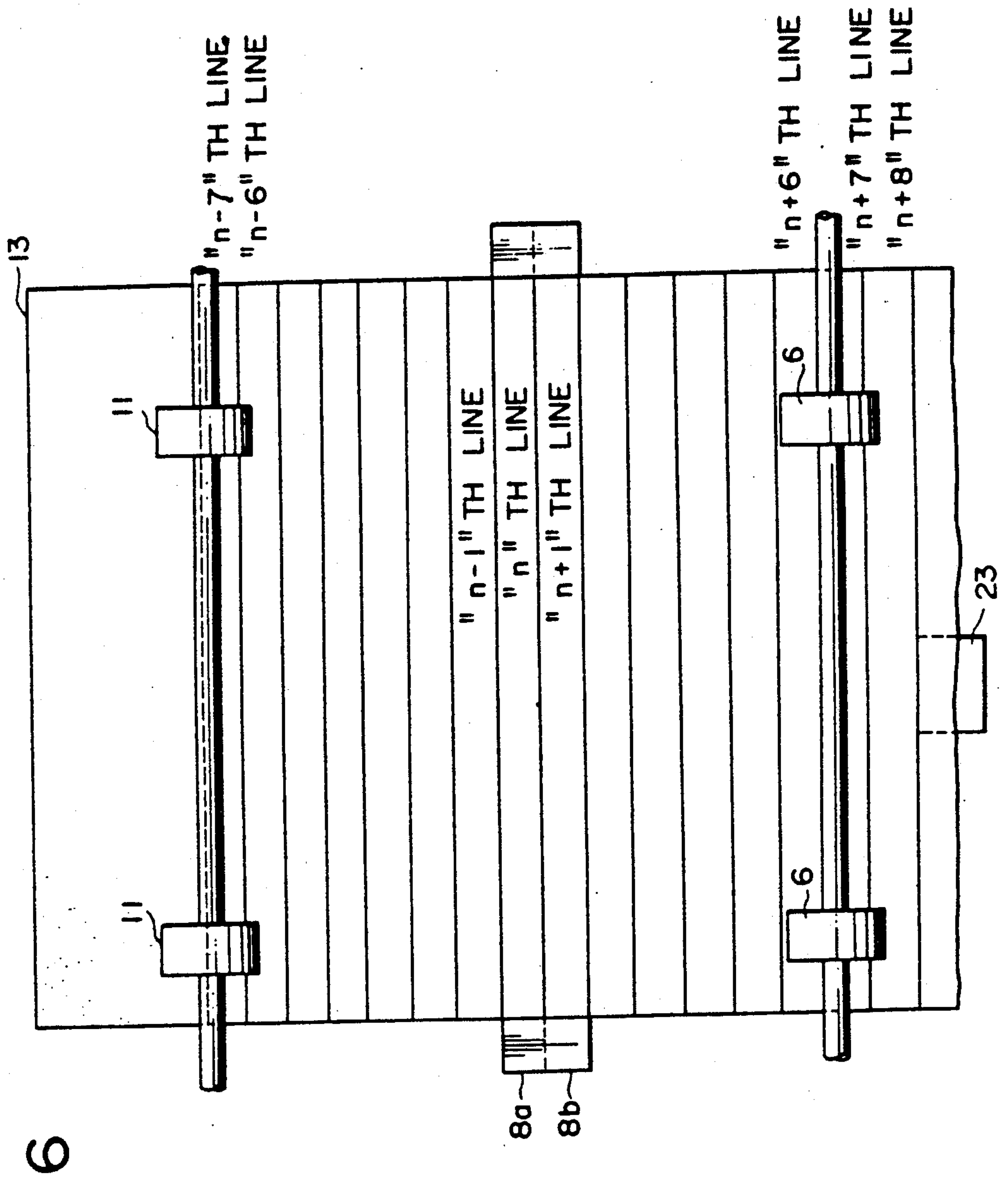
FIG. 6 shows an imitative diagram representing positional relationships among recording lines on the recording sheet, a platen for supporting the recording sheet, and feed roller for feeding the recording sheet.

FIG. 6 is an imitative diagram showing positional relationships among recording lines on the recording sheet 13, platen 8, and sheet feed rollers 6, 11. As shown in FIG. 6, the recording device according to this embodiment, a distance between the sheet sensor 23 and the pre-heat zone 8$b$ is equivalent to that for eight lines of the recording sheet being fed; a distance between the pre-heat zone 8$b$ and a recording zone 8$a$ equivalent to that for one line of the recording sheet being fed. Each length of the recording zone 8$a$ and pre-heat zone 8$b$ in the sheet feed direction is equivalent to that for one recording line. In addition, the distance between the recording zone 8$a$ and the position where the recording sheet 13 touches the upper pinch roller 11 is equivalent to that for seven lines of the printing paper being fed.

Figure 7A:
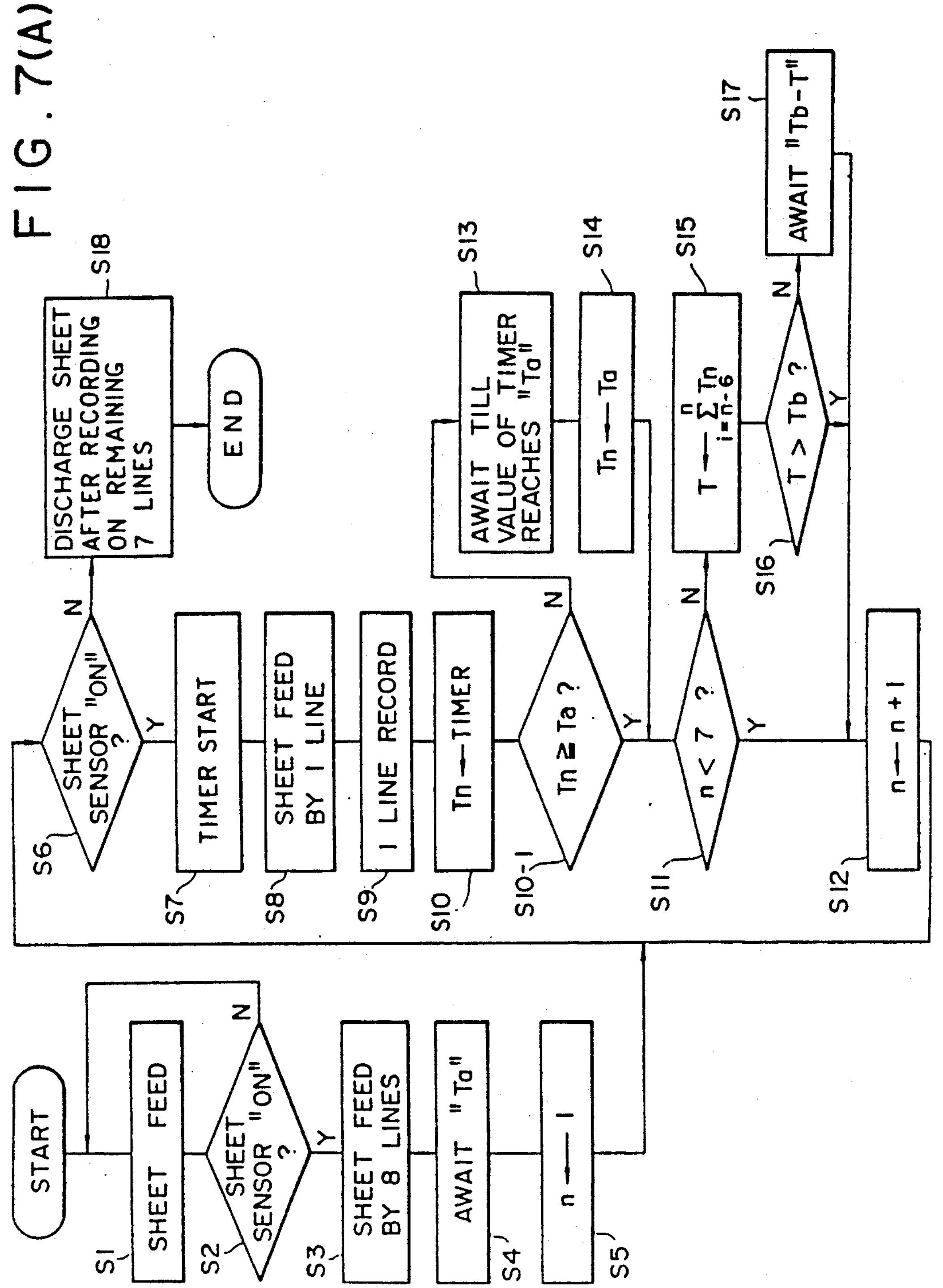
FIGS. 7(A) through 7(D) show flow charts representing operations of embodiments of the recording device according to the present invention.

Referring to a flow chart of FIG. 7(A), a carriage driving operation and a sheet feed operation executed by the recording device of the embodiment are described.

When a record start signal is outputed from a host machine and so forth, a sheet feed members such as an auto cut sheet feeder of the ink jet recording device feeds the recording sheet 13 in step S1. In step S2, the sheet sensor 23 detects the top end portion of the recording sheet 13. In step S3, the lower sheet feed roller 5 and lower pinch roller 6 feed eight lines of the recording sheet and guide the top line thereof to the pre-heat zone 8$b$ of the platen 8. However, in step S2, if the sheet sensor 23 cannot detect the recording sheet 13, the flow returns back to step S1.

In step S4, the flow reads data relating to a heating time $T_a$ from the heating time table 30 prepared in the ROM 28 in advance in accordance with a circumstantial temperature value detected by the thermister 12, and an operation of the device is ceased for $T_a$ based upon the value counted by a timer 33. Thus, the top line of the recording sheet 13 which is guided to the pre-heat zone 8$b$ is heated for $T_a$ by the heated platen 8 until the temperature of the surface becomes the recordable temperature $\theta_1$. In step S5, variable "n" which represents which line of recording sheet is recorded is set to 1. In step S6, the sheet sensor 23 detects whether the recording sheet 13 is present or absent. When the sheet sensor 23 cannot detect the present of the recording sheet 13, the flow goes to step S18 which will be described later. When the sheet sensor 23 detects the present of the recording sheet 13, the flow goes to step S7.

In step S7, the timer 33 begins to count a time. In step S8, the recording sheet 13 is fed so that the recording line corresponding to the pre-heat zone 8$b$ to the recording zone 8$a$. In step S9, the ink jet head 1 and carriage 9 are respectively drived so as to record data on one line.

In step S10, a value of the timer 33 is read; it is substituted for the variable $T_n$ (where n=1, 2, 3, . . . ) which represents a time taken from step S7 to step S9; and in step S10-11 the result is compared with the heating time $T_a$ having been read in step S4. When the result of comparison is $T_n \geqq T_a$, namely, it is determined that the succeeding line of sheet is sufficiently heated in the pre-heat zone 8b, the flow goes to step S11. Conversely, when $T_n < T_a$, namely, it is determined that the succeeding line of the recording sheet 13 is not sufficiently heated, the flow stops the operation of the carriage motor 3 or the sheet feed motor 22 until the value of the timer 33 becomes equal to $T_a$ in step S13, and the variable $T_n$ is substituted by the value of $T_a$ in step S14.

In step S11, it is determined whether the recording line is in the range from line 1 to line 6 in accordance with the variable "n". In other words, after up to line 6 has been recorded, when the recording sheet 13 is fed, since the recording sheet 13 corresponding to the line 1 touches the pinch roller 11, the process performs the steps step S15 to step S17 described later for recording data on line 7 or later. However, for recording data on line 6 or earlier, the variable "n" is increased by 1 in step S12 and returns back to step S6 so as to continue the above steps.

When it is determined in step S11 that the recording line on which the recording operations are executed is line 7 or later, it computes the time T taken from the six earlier recording line to the present recording line by adding $T_{n-6}$, $T_{n-5}$, . . . , $T_n$ in step S15. In step S16, the cooling time $T_b$ necessary for the sheet surface temperature to drop to $\theta_3$ is compared with the above T. In step S16, if it is determined that $T > T_b$, namely, the line which touches the upper pinch roller 11 by the next sheet feed operation is sufficiently cooled after data are recorded until the present time and the recorded ink will be not transferred to the roller 11, the flow returns back to step S12. However, it is determined that the ink may be transferred to the roller 11, namely, $T < T_b$, the timer 33 counts $T_b - T$ and the flow returns back to step S12.

After data are repeatedly recorded on the recording sheet 13, when the sensor 23 detects the trailing end of the recording sheet 13, in step S6, the recording operations to the remaining seven lines from the trailing end of the recording sheet are executed in step S18 and feeds the recording sheet 13 to discharge it from the recording device. Now that a sequence of the sheet feeding, recording, and discharging operations have been completed.

With the above operations of the ink jet recording device corresponding to the embodiment, even if a volume of data to be recorded on one recording line is small, a portion of the recording sheet corresponding to the succeeding line can be sufficiently heated and a heat soluble ink can be permeated into fibers composing the recording sheet 13, resulting in a good recording quality. In this embodiment, since the sheet heating time is determined by means of the heating time table 30 which stepwise stores sheet heating time $T_a$ in accordance with an ambient temperature, even if the circumstantial ambient temperature changes, the heating time can be flexibly adjusted.

Figure 7B:
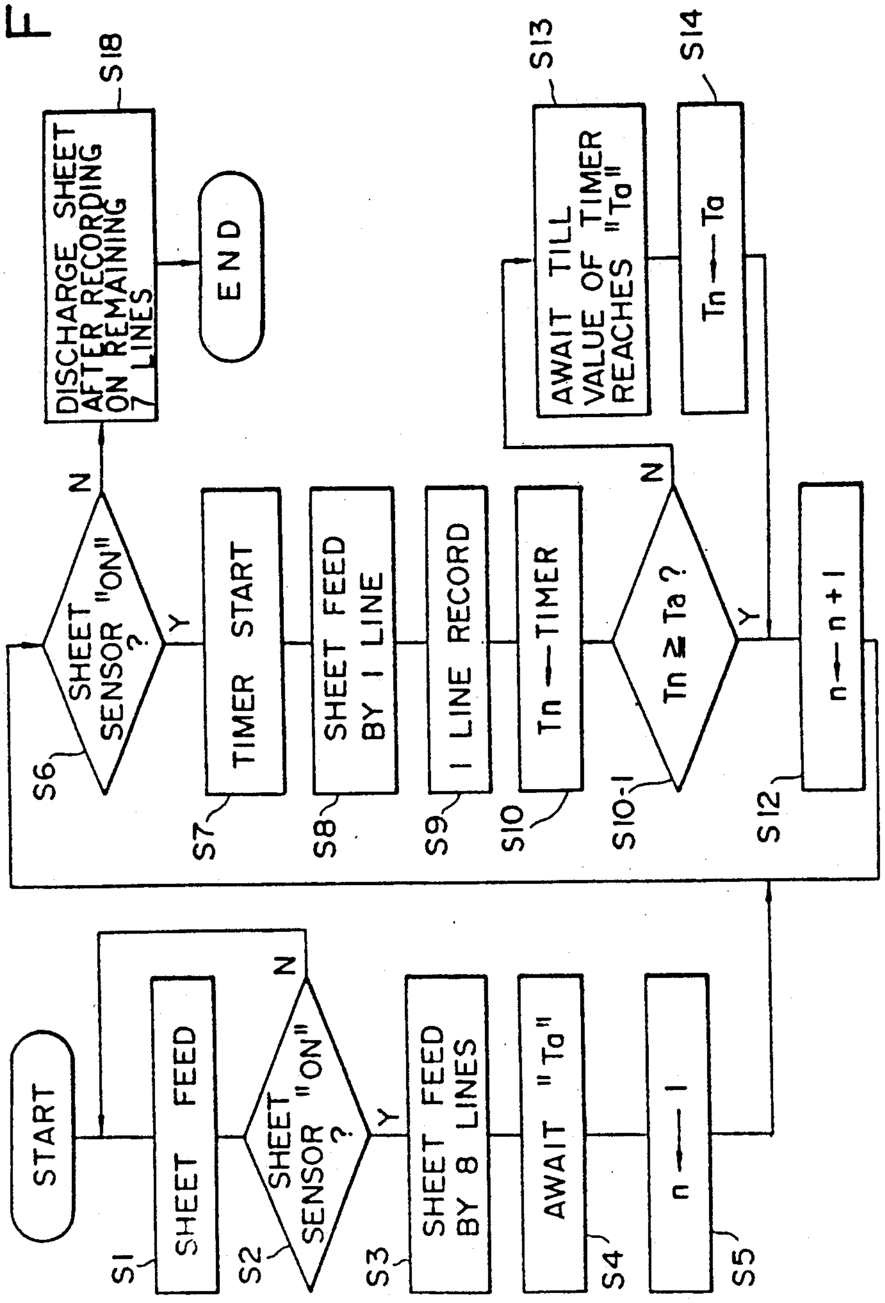

In this embodiment, since the carriage is driven and the sheet feed timing is controlled with considering the sheet cooling time as well as sheet heating time, it prevents wet ink on the recording sheet from being transferred to the roller and the surrounding portions. It may be considered, however, that the sheet feed timing is controlled with considering only the sheet heating timing, as shown in FIG. 7(B), since the time required for feeding the recording sheet to a pinch roller is longer than the time required for heating the recording sheet as above.

Figure 7C:
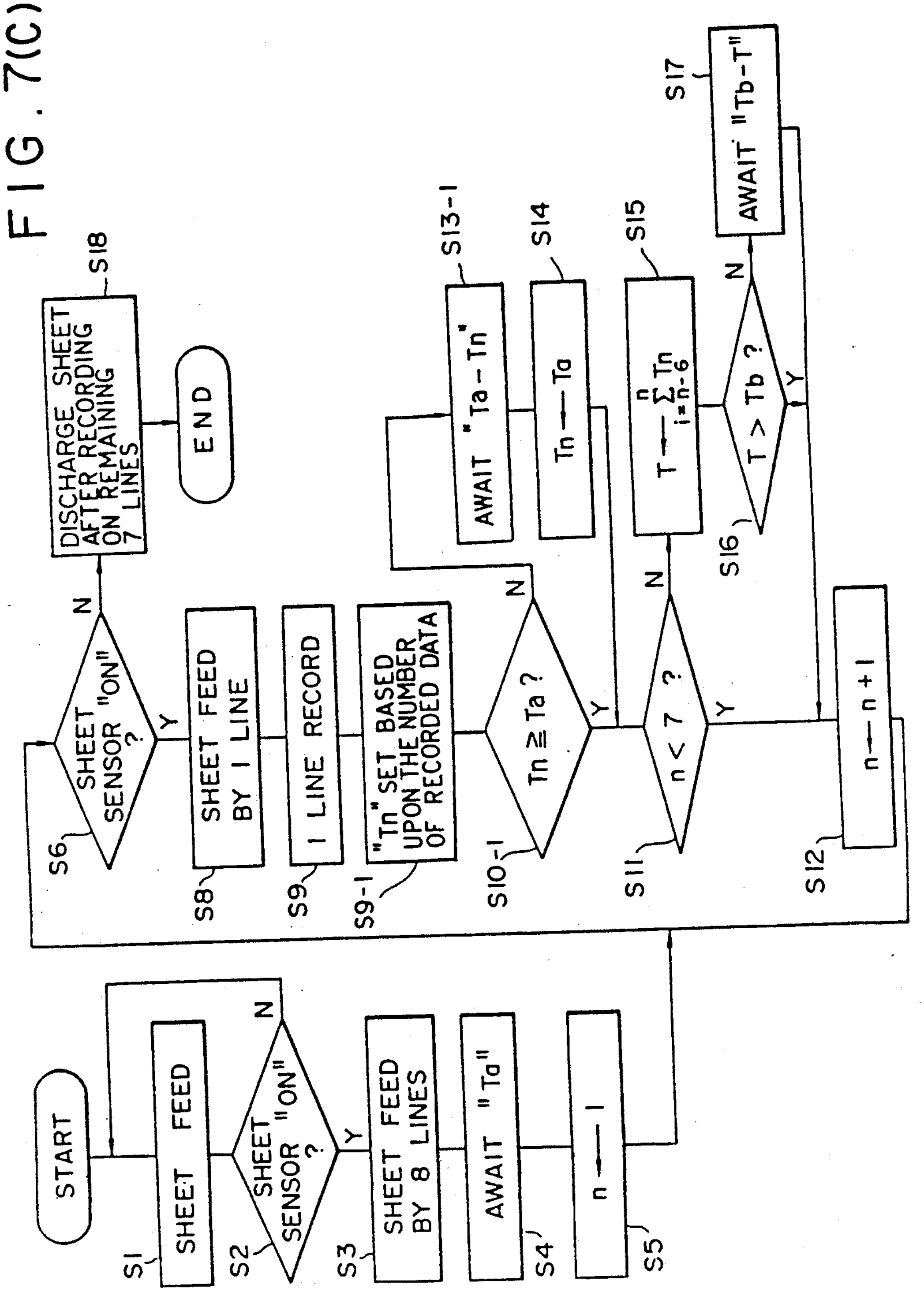

In the above embodiment, the time required for recording on one line of the recording sheet 13 is counted with the timer 33; the result is temporarily stored in the buffer 32; and it is compared with the heating time $T_a$ for which the surface temperature of the recording sheet 13 rises to the recordable temperature $\theta_1$ and with the time $T_b$ for which the temperature of the ink fixed on the recording sheet 13 drops to the sheet surface temperature $\theta_3$ at which the ink is not transferred to the upper pinch roller 11. However, as another embodiment, it is possible, as shown in FIG. 7(C), to consider the following configuration. The amount of data for one line is temporarily stored in the buffer 32. The carriage waiting time $T_a$ is computed with a conversion table which converts the amount of data stored in the ROM 28 into the heating time $T_a$. After the recording operations on one line are all finished, by stopping the carriage 9, the recording sheet 13 may be sufficiently heated.

Figure 7D:
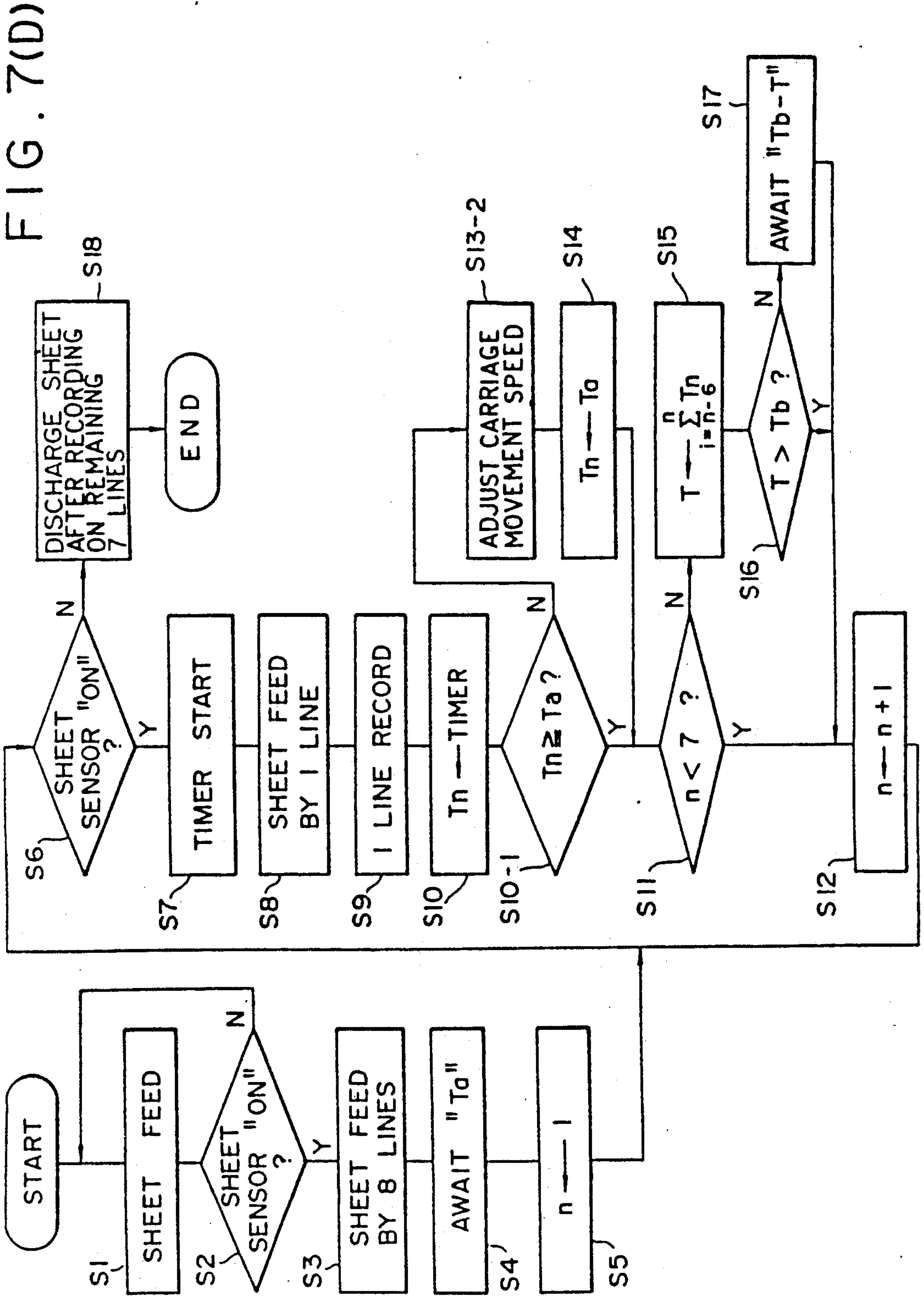

Although in the first embodiment the operations of the carriage 9 and paper feed are temporarily stopped, as another embodiment, as shown in FIG. 7(D), by changing a moving speed of the carriage 9 by the reading head 16, the sheet heating time $T_a$ may be obtained.

What is claimed is:

1. A recording device employing a recording sheet, comprising a platen member for supporting said recording sheet, a recording head member provided on a carriage member being movable along said platen member, for executing recording operations on said recording sheet, sheet feed means for feeding said recording sheet by one recording line, and heat means for heating a predetermined portion of said recording sheet, said recording device further comprises:

memory means for storing data relating to a period of time required for heating said predetermined portion of said recording sheet till a temperature value of said predetermined portion reaches a predetermined value;

parameter set means for setting a predetermined parameter based upon a period of time having been required for executing recording operations on a certain recording line; and control means for controlling said sheet feed means so as to be operated in a predetermined manner in accordance with both the data stored in said memory means and the parameter set by said parameter set means.

2. The recording device according to claim 1 wherein said predetermined portion of said recording sheet comprises a portion on which a recording operation is not executed.

3. The recording device according to claim 1 wherein said predetermined manner is that said recording sheet is fed by said sheet means after the temperature value of said predetermined portion of said recording sheet reaches said predetermined value.

4. The recording device according to claim 1 wherein said predetermined parameter is the period of time itself having been required for executing recording operations on the certain recording line.

5. The recording device according to claim 1 wherein said control means includes compare means for comparing the parameter with the data stored in said memory means and controls said sheet feed means so as to feed said recording sheet after said predetermined period of time corresponding to said predetermined value elapses in case that a value corresponding to the parameter is less than a value corresponding to said predetermined period of time.

6. The recording device according to claim 1 wherein said parameter set means sets the predetermined parameter before recording operations on a certain recording line of said recording sheet.

7. The recording device according to claim 5 wherein said parameter set means sets the predetermined parameter in accordance with the number of data having been recorded on the preceding recording line of the certain recording line.

8. The recording device according to claim 6 wherein said control means controls a speed of movement of said carriage member in case that a value corresponding to the parameter set by parameter set means is less than said predetermined period of time.

9. The recording device according to claim 1 wherein said memory means stores a plurality of data respectively relating to said predetermined period of time, each of said period of time respectively corresponding to a circumstantial temperature value.

10. The recording device according to claim 1 wherein said recording head member comprises a ink jet head spraying a heat soluble ink capable of permeating into fibers composing said recording sheet.

11. The recording device according to claim 5 wherein said control means further includes examine means for examining whether the time required for executing operaitons relating to a predetermined number of preceding recording lines of a recording line on which recording operations are to be executed is less than a predetermined value, and further controls said sheet feed means so as not to feed said recording sheet before the time examined by said examine means reaches said predetermined value.

12. The recording device according to claim 9 which further comprises detect means for detecting a circumstantial temperature, one of said data stored in said memory means being selected for controlling said sheet feed means with said parameter based upon a result of detection executed by said detect means.

13. The recording device according to claim 12 wherein said detect means comprises a thermister for being operated in accordance with the circumstantial temperature.

14. A recording device employing a recording sheet, comprising a platen member for supporting said recording sheet, a recording head member provided on a carriage member being movable along said platen member, for executing recording operations on said recording sheet, sheet feed means for feeding said recording sheet by one recording line, and heat means for heating at least a portion of said recording sheet corresponding to a recording line on which the recording operations are to be executed and the succeeding recording line, said recording device further comprises:

memory means for storing data relating to a predetermined period of time required for heating said recording sheet till a temperature value of the portion of said recording sheet corresponding to said succeeding recording line reaches a predetermined value;

parameter set means for setting a predetermined parameter based upon a period of time having been required for executing recording operations on a certain recording line; and control means for controlling said sheet feed means so as to be operated in a predetermined manner in accordance with both the data stored in said memory means and the parameter set by said parameter set means.

15. The recording device according to claim 14 wherein said predetermined manner is that said recording sheet is fed by said sheet feed means after the temperature value of the portion of said recording sheet corresponding to said succeeding line reaches said predetermined value.

16. The recording device according to claim 14 wherein said predetermined parameter is the period of time itself having been required for executing recording operations on the certain recording line.

17. The recording device according to claim 15 wherein said control means further controls said sheet feed means so as not to feed said recording sheet in case that a predetermined period of time has not elapsed after recording operations on a recording line located before a line with a predetermined interval of length on which recording operations are to be executed.

18. A recording device employing a recording sheet, comprising a platen member for supporting said recording sheet, a recording head member provided on a carriage member being movable along said platen member, for executing recording operations on said recording sheet, sheet feed means for feeding said recording sheet by one recording line, and heat means for heating a first predetermined portion of said recording sheet, said recording device further comprises:

first examine means for examining whether a temperature value of said first predetermined portion is larger than a first predetermined value;

second examine means for examining whether a temperature value of a second predetermined portion of said recording sheet is less than a second predetermined value; and control means for controlling said sheet feed means so as to feed said recording sheet in case that at least the value examined by said first examine means is larger than said first predetermined value and the value examined by said second examine means is less than said second predetermined value.

19. The recording device according to claim 18 wherein said first predetermined portion is a portion corresponding to a recording line on which the recording operations are to be executed and said second predetermined portion is a portion corresponding to a recording line located before said first predetermined portion with a predetermined interval of length.

20. The recording device according to claim 18 wherein said first examine means comprises a first timer means for counting a period of time to be required for raising a temperature value of said first predetermined portion to said first predetermined value; and wherein said second examine means comprises a second timer means for counting a period of time to be required for sinking a temperature value of said second predetermined portion to said second predetermined value.

* * * * *